United States Patent
Firestone

[15] 3,668,197
[45] June 6, 1972

[54] ESTERS AND AMIDES OF (DIAZOMETHYL) PHOSPHONIC ACID

[72] Inventor: Raymond A. Firestone, Fanwood, N.J.

[73] Assignee: Merck & Co., Inc., Rahway, N.J.

[22] Filed: July 22, 1969

[21] Appl. No.: 843,763

[52] U.S. Cl. ............260/239 AA, 204/158 HE, 195/65, 260/141, 260/348 R, 260/348 SC, 260/566 B, 260/923, 260/944, 260/946, 260/960, 260/968, 260/999, 424/278

[51] Int. Cl. ............C07c 113/02, C07f 9/32, C07d 1/12

[58] Field of Search............260/239 A, 141, 239 AA, 348 R, 260/923, 944, 968, 566 B

[56] References Cited

UNITED STATES PATENTS

| | | | |
|---|---|---|---|
| 2,710,248 | 6/1955 | Sisler et al. | 260/566 X |
| 2,710,862 | 6/1955 | Schroeder | 260/239 |
| 2,773,893 | 12/1956 | Radde | 260/239 X |
| 2,774,782 | 12/1956 | Rorig | 260/239 X |
| 2,965,667 | 12/1960 | Tolkmith | 260/923 |
| 3,242,166 | 3/1966 | Krespan et al. | 260/239 |
| 3,251,830 | 5/1966 | Knutson | 260/239 |
| 3,332,936 | 7/1967 | Diekmann | 260/239 |
| 3,355,521 | 11/1967 | Bliss et al. | 260/923 |

OTHER PUBLICATIONS

Gutsche, " Organic Reactions," Volume VIII, pp. 364, 365, 372, 373, (1954).
Theilheimer (I), " Synthetic Methods of Organic Chemistry," Vol. 16, pp. 171– 172, (1962).
Theilheimer (II), " Synthetic Methods of Organic Chemistry," Vol. 19, p. 155 (1965).
Zollinger, " Azo and Diazo Chemistry Aliphatic and Aromatic Compounds," pp. 71– 72 (1961).

*Primary Examiner*—Floyd D. Higel
*Attorney*—Joseph W. Molasky, J. Jerome Behan and I. Louis Wolk

[57] ABSTRACT

A method for the preparation of (cis-1,2-epoxypropyl)-phosphoric acid diesters and diamides which comprises treating the corresponding diester or diamide of (diazomethyl)-phosphonic acid with acetaldehyde or, alternatively, treating a mixture of an appropriate diester or diamide of formylphosphonic acid with diazoethane. The (cis-1,2-epoxypropyl) acid diesters and diamides thus obtained have utility as intermediates inasmuch as they may be converted to the pharmacologically active (cis-1,2-epoxypropyl)phosphonic acid and to the salts thereof which inhibit the growth of gram-positive and gram-negative pathogenic bacteria.

3 Claims, No Drawings

ESTERS AND AMIDES OF (DIAZOMETHYL) PHOSPHONIC ACID

This invention relates to a novel method for the preparation of (cis-1,2-epoxypropyl)phosphonic acid diesters and (cis-1,2-epoxypropyl)phosphonic acid diamides via the reaction of a diester or a tetra-substituted diamide of (diazomethyl)phosphonic acid with acetaldehyde or, alternatively, via the reaction of a diester or a tetra-substituted diamide of formylphosphonic acid with diazoethane.

The process is effected by simply bringing the reactants together and allowing the mixture to stand over an extended period or, alternatively, the reaction may be initiated by subjecting the reaction mixture to irradiation via treatment with ultraviolet light. The temperature at which the reaction is conducted is not a critical aspect of this invention and, in general, the reaction may be conducted at temperatures in the range of from about −20° C. up the boiling point of the solvent employed. However, when diazoethane is the reactant the synthesis is most conveniently conducted at temperatures in the range of from about −20° C. up to about 10° C.

The reaction may be conducted in any diluent in which the starting materials are reasonably soluble and which is substantially inert to the reactants employed; however, it should be noted that when the reaction is conducted in the presence of ultraviolet irradiation, the solvent should be one which is both stable to ultraviolet light and does not act as a preferential absorber of ultraviolet irradiation. Suitable solvents which may be employed, both in the presence and in the absence of ultraviolet light, include, for example, diethyl ether, petroleum ether, cyclohexane, tetrahydrofuran, dioxane, water, alkanols, for example, lower alkanols such as methanol, ethanol, propanol, isopropanol and the like or a mixture of water and an alkanol; however, when the reaction is conducted simply by bringing the reactants together, i.e., in the absence of irradiation, the preferred solvents are water, an alkanol, as, for example, a lower alkanol such as methanol and the like or a mixture of water and an alkanol. The following equation illustrates the process of this invention:

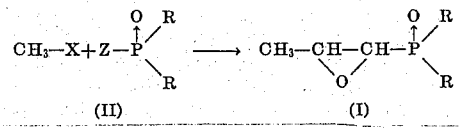

wherein X and Z each represent a formyl radical of the formula —CHO or a diazomethyl radical of the formula —CHN$_2$, with the proviso that X and Z cannot both represent formyl or diazomethyl at the same time; R is alkoxy, for example, lower alkoxy such as methoxy, ethoxy, n-propoxy, isopropoxy, n-butoxy, pentyloxy and the like, monohalo-alkoxy, for example, monohalo lower alkoxy such as 2-chloroethoxy and the like, polyhalo-alkoxy, for example, polyhalo-lower alkoxy such as 2,2-dichloroethoxy or 2,2,2-trichloroethoxy and the like, cycloalkyloxy, for example, lower cycloalkyloxy such as cyclopentyloxy, cyclohexyloxy and the like, alkenyloxy, for example, lower alkenyloxy such as allyloxy and the like, aryloxy, for example, mononuclear and binuclear aryloxy such as phenoxy, naphthyloxy and the like, aralkyloxy, for example, mononuclear aralkyloxy such as benzyloxy, phenethyloxy and the like or secondary amino radical of the formula: —N(R$^1$)$_2$ wherein R$^1$ is alkyl, for example, lower alkyl such as methyl, ethyl and the like.

A preferred embodiment of this invention comprises the reaction of a diester of (diazomethyl)phosphonic acid or a tetra-substituted diamide of (diazomethyl)phosphonic acid with acetaldehyde. The following equation illustrates this process:

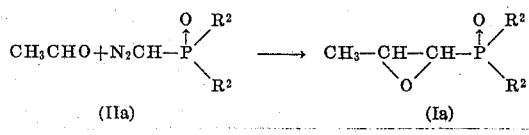

wherein, R$^2$ is lower alkoxy such as methoxy and the like, polyhalo-alkoxy, for example, polyhalo-lower alkoxy such as 2,2,2-trichloroethoxy and the like, alkenyloxy, for example, lower alkenyloxy such as allyloxy and the like or aralkyloxy, for example, mononuclear aralkyloxy such as benzyloxy, phenethyloxy and the like.

Another embodiment of this invention comprises the reaction of a diester of formylphosphonic acid with diazoethane. The following equation illustrates this process:

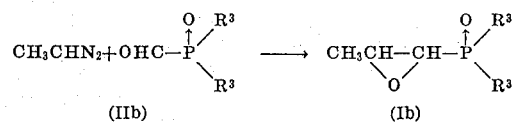

wherein R$^3$ is alkoxy, for example, lower alkoxy, such as methoxy, ethoxy, n-propoxy, isopropoxy, n-butoxy, pentyloxy and the like, polyhalo-alkoxy, for example, polyhalo-lower alkoxy such as 2,2,2-trichloroethoxy and the like or cycloalkyloxy, for example, lower cycloalkyloxy such as cyclopentyloxy, cyclohexyloxy and the like.

The (cis-1,2-epoxypropyl)phosphonic acid diesters and (cis-1,2-epoxypropyl)phosphonic acid diamides prepared according to this invention are useful as intermediates in the synthesis of (±) and (−) (cis-1,2-epoxypropyl)phosphonic acid and its salts. The (±) and (−) (cis-1,2epoxypropyl)phosphonic acid and the salts thereof, such as the sodium and calcium salts, are antimicrobial agents which have utility in inhibiting the growth of gram-positive and gram-negative pathogenic bacteria and are active against Bacillus, Escherichia, Staphylococci, Salmonella and Proteus pathogens and antibiotic resistant strains thereof. Thus, (±) and (−) (cis-1,2-epoxypropyl)phosphonic acid and the salts thereof can be used as antiseptic agents to remove susceptible organisms from pharmaceutical, dental and medical equipment and can also be used in other areas subject to infection by such organisms.

The diester derivatives of (cis-1,2-epoxypropyl)phosphonic acid may be converted to (cis-1,2-epoxypropyl)phosphonic acid or its salts by various methods, including treatment with an aqueous solution of a mineral acid, such as hydrochloric acid or sulphuric acid under carefully buffered conditions, by hydrogenolysis, by treatment with an aqueous solution of an alkali metal or alkaline earth metal hydroxide or by treatment with trimethylchlorosilane followed by aqueous hydrolysis or enzymatically, with the method of choice depending on the particular ester being cleaved. For example, when the ester is a dimethyl ester, the conversion to (cis-1,2-epoxypropyl)phosphonic acid is most advantageously conducted by treating the ester with trimethylchlorosilane followed by the aqueous hydrolysis of the silane ester intermediate thus obtained. The alkyl silane ester interchange is accomplished by refluxing the silane compound, such as chlorotrimethylsilane, with the methyl ester in an inorganic solvent such as hexane, benzene and the like. In addition to the foregoing, the alkyl esters of (cis-1,2-epoxypropyl)phosphonic acid and the aryl analogs thereof, may be converted to the free acid by alkaline hydrolysis. However, in view of the stability of the dialkyl esters, it is not uncommon to find that the treatment of a dialkyl (cis-1,2-epoxypropyl)phosphonate with an aqueous solution of a base affords the monoalkyl ester intermediate and, therefore, the ultimate conversion of the alkyl diester to the salt or free acid necessitates a second step, such as treatment with a photochemical agent or an acidic reagent.

Hydrogenolysis is particularly effective in converting the aralkyl and alkenyl esters of (cis-1,2-epoxypropyl)phosphonic acid to their corresponding acids and, preferably, the hydrogenation is conducted in the presence of a Raney nickel catalyst in a base such as triethylamine, pyridine, dimethylaniline and the like, within a temperature range of from about room temperature up to about 200° C. Suitably inert organic solvents which may be employed in the hydrogenation process include methanol, ethanol, ethylacetate, acetic acid, dimethyl ether, diethyl ether, tetrahydrofuran, hexane, xylene, benzene and the like.

Amides of (cis-1,2-epoxypropyl)phosphonic acid may be converted to (cis-1,2-epoxypropyl)phosphonic acid via the use of acidic hydrolyzing agents such as aqueous hydrochloric acid, hydrobromic acid, sulfuric acid and the like.

The diester substituted (diazomethyl)phosphonates and the tetra-substituted (diazomethyl)phosphonic diamide intermediates (II, infra) which are employed in the preparation of the (cis-1,2-epoxypropyl)phosphonates (I, supra) are conveniently prepared by the reaction of a diester substituted phosphonohalodate or tetra-substituted phosphonodiamidic halide with diazomethane. Alternatively, the diester substituted (diazomethyl)phosphonates may be prepared by treating a diester substituted (hydrazonomethyl)phosphonate with an oxidizing agent. The first of the above-mentioned processes, i.e., the reaction of a diester substituted phosphonohalodate or tetra-substituted phosphonodiamidic halide with diazomethane is conveniently conducted at a temperature in the range of from about −20° C. to about 25° C. The reaction may be conducted in any diluent which is substantially inert to the reactants; however, diethyl ether is the preferred solvent. The following equation illustrates this process:

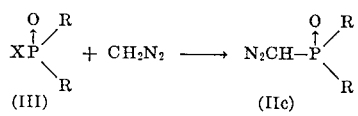

wherein R is as defined above and X is halo, for example, chloro, bromo, fluoro and the like.

A second method for preparing the diester substituted (diazomethyl)phosphonates comprises treating a diester substituted (hydrazonomethyl)phosphonate with an oxidizing agent such as mercuric oxide, silver oxide, manganese dioxide, nickel oxide and the like. This reaction is conveniently conducted at a temperature of from about 0° C. to the boiling point of the particular solvent employed. Any diluent which is substantially inert to the reactants may be employed, for example, benzene, petroleum ether, diethyl ether, cyclohexane and the like. The following equation illustrates this reaction:

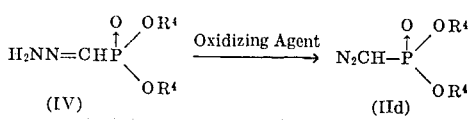

wherein —OR⁴ is alkoxy, monohalo-alkoxy, polyhalo-alkoxy, cycloalkyloxy, alkenyloxy, aryloxy or aralkoxy such as are defined above in the definition of the radical R.

The diester substituted (hydroazonomethyl)phosphonate (IV) which is employed as the starting material in the preparation of the diester substituted (diazomethyl)phosphonate (IIb, supra) may be prepared by reacting a formyl phosphonate (V, infra) with hydrazine. The reaction may be conveniently conducted at the reflux temperature of the solvent employed. Such solvents include, for example, benzene, petroleum ether, cyclohexane, diethyl ether and the like. The water formed during the reaction may be removed azeotropically or by bringing the water into contact with an absorbent as, for example, with an anhydrous alkali metal salt such as potassium carbonate and the like. The following equation illustrates this process:

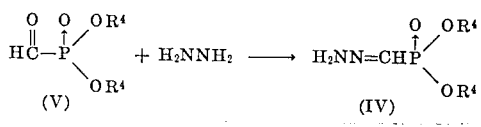

wherein —OR⁴ is as defined above.

The designation cis used in describing the (1,2-epoxypropyl)phosphonic acid compounds means that each of the hydrogen atoms attached to carbon atoms 1 and 2 of the propyl phosphonic acid are on the same side of the oxide ring.

The examples which follow illustrate a method for preparing (cis-1,2-epoxypropyl)phosphonic acid esters and salts according to the process of this invention. However, the examples are illustrative only and it will be apparent to one having ordinary skill that all the products of the invention may be prepared by substituting the appropriate starting materials for those used in the examples.

EXAMPLE 1

Dibenzyl (Cis-1,2-epoxypropyl)phosphonate

Step A: Dibenzyl (Hydrazonomethyl)phosphonate

A solution of dibenzyl formylphosphonate (0.1 mole) and hydrazine (0.1 mole) in benzene (50 ml.) is stirred for 20 minutes in the presence of anhydrous potassium carbonate. The mixture is filtered and the filtrate concentrated to dryness to yield dibenzyl (hydrazonomethyl)phosphonate.

Step B: Dibenzyl (Diazomethyl)phosphonate

To a solution of dibenzyl (hydrazonomethyl)phosphonate (0.1 mole) in benzene (50 ml.) is added yellow mercuric oxide (0.11 mole). The mixture is stirred for 4 hours at 30° C., filtered and the filtrate concentrated to dryness to yield dibenzyl (diazomethyl)phosphonate.

Step C: Dibenzyl (Cis-1,2-epoxypropyl)phosphonate

To a solution of dibenzyl (diazomethyl)phosphonate (0.1 mole) in diethyl ether (25 ml.) is added acetaldehyde (0.3 mole). The solution is irradiated with ultraviolet light until the nitrogen evolution ceases. The ether and excess acetaldehyde are removed under reduced pressure and the residue distilled under vacuum to yield dibenzyl (cis-1,2-epoxypropyl)phosphonate.

By substituting for the dibenzyl formylphosphonate of Step A, Example 1, an equimolar quantity of diphenyl formylphosphonate, dinaphthyl formylphosphonate and diphenethyl formylphosphonate and by following substantially the procedure described therein, there is obtained, respectively, diphenyl (hydrazonomethyl)phosphonate, dinaphthyl (hydrazonomethyl)phosphonate and diphenethyl (hydrazonomethyl)phosponate which, when substituted for the dibenzyl (hydrazonomethyl)phosphonate of Step B, Example 1 and following substantially the procedure described therein, affords, respectively, diphenyl (diazomethyl)phosphonate, dinaphthyl (diazomethyl)phosphonate and diphenethyl (diazomethyl)phosphonate which, when substituted for the dibenzyl (diazomethyl)phosphonate of Step C, Example 1, and by following substantially the procedure described therein, yields, respectively, diphenyl (cis-1,2-epoxypropyl)phosphonate, dinaphthyl (cis-1,2-epoxypropyl)phosphonate and diphenethyl (cis-1,2-epoxyproply)phosphonate.

EXAMPLE 2

Di-n-butyl (Cis-1,2-epoxypropyl)phosphonate

Step A: Di-n-butyl (Diazomethyl)phosphonate

To an ether solution of di-n-butyl phosphonochlorodate at −10° C. is added an equimolar quantity of a cold ether solution of diazomethane. The solution is stirred at −10° C. for 30 minutes and then allowed to warm up to room temperature. Removal of the ether yields di-n-butyl (diazomethyl)phosphonate.

Step B: Di-n-butyl (Cis-1,2-epoxypropyl)phosphonate

To a solution of acetaldehyde in diethyl ether (25 ml.) is added an equimolar quantity of di-n-butyl (diazomethyl)phosphonate. This solution is irradiated with ultraviolet light until the nitrogen evolution ceases. The ether and excess acetaldehyde are removed under reduced pressure and the residue is distilled under vacuum to yield di-n-butyl (cis-1,2-epoxypropyl)phosphonate.

By substituting for the di-n-butyl phosphonochlorodate of Step A, Example 2, an equimolar quantity of dimethyl phosphonochlorodate, diethyl phosphonochlorodate and di-n-propyl phosphonochlordate and by following substantially the procedure described therein, there is obtained, respectively, dimethyl (diazomethyl)phosphonate, diethyl (diazomethyl)phosphonate and di-n-propyl (diazomethyl)phosphonate which, when substituted for the di-n-butyl (diazomethyl)phosphonate of Step B, Example 2, and by following substantially the procedure described therein, there is obtained, respectively, dimethyl (cis-1,2-epoxypropyl)phosphonate, diethyl (cis-1,2-epoxypropyl)phosphonate and di-n-propyl (cis-1,2-epoxypropyl)phosphonate.

EXAMPLE 3

P-(Cis-1,2-epoxypropyl)-N,N,N',N'-Tetramethylphosphonic Diamide

Step A: Diazomethylphosphonic Acid, Tetramethyl Diamide

To an ether solution of tetramethylphosphono diamidic chloride at −10° C. is added an equimolar quantity of a cold ether solution of diazomethane. The solution is stirred at −10° C. for 30 minutes and then allowed to warm up to room temperature. Removal of the ether yields the diazomethylphosphonic acid tetramethyl diamide.

Step B: P-(Cis-1,2-epoxypropyl)-N,N,N',N'-Tetramethylphosphonic Diamide

To a solution of acetaldehyde in diethyl ether (25 ml.) is added an equimolar quantity of diazomethylphosphonic acid tetramethyl diamide. This solution is irradiated with ultraviolet light until the evolution of nitrogen ceases. The ether and excess acetaldehyde are removed under reduced pressure to yield P-(cis-1,2-epoxypropyl)-N,N,N',N'-tetramethylphosphonic diamide.

By substituting for the tetramethylphosphono diamidic chloride of Step A, Example 3, an equimolar quantity of tetraethylphosphono diamidic chloride and by following substantially the procedure described therein, there is obtained diazomethylphosphonic acid, tetraethyl diamide which, when substituted for the diazomethylphosphonic acid, tetramethyl diamide of Step B, Example 3, and by following substantially the procedure described therein, there is obtain P-(cis-1,2-epoxypropyl)-N,N,N',N'-tetraethylphosphonic diamide.

EXAMPLE 4

Diallyl (Cis-1,2-epoxypropyl)phosphonate

Step A: Diallyl (Hydrazonomethyl)phosphonate

A solution of diallyl formylphosphonate (0.1 mole) and hydrazine (0.1 mole) in benzene (50 ml.) is stirred in the presence of anhydrous potassium carbonate for 20 minutes. The mixture is filtered and the filtrate concentrated to dryness to yield diallyl (hydrazonomethyl)phosphonate.

Step B: Diallyl (Diazomethyl)phosphonate

To a solution of diallyl (hydrazonomethyl)phosphonate (0.1 mole) in benzene (50 ml.) is added yellow mercuric oxide (0.11 mole). The mixture is stirred for 4 hours at 30° C., filtered and the filtrate concentrated to dryness to yield diallyl (diazomethyl)phosphonate.

Step C: Diallyl (Cis-1,2epoxypropyl)phosphonate

To a solution of a diallyl (diazomethyl)phosphonate (0.1 mole) in diethyl ether (25 ml.) is added acetaldehyde (0.3 mole). The solution is irradiated with ultraviolet light until the evolution of nitrogen ceases. The ether and excess acetaldehyde are removed under reduced pressure and the residue distilled under vacuum to yield diallyl (cis-1,2-epoxypropyl)phosphonate.

By substituting for the diallyl formylphosphonate of Step A, Example 4, an equimolar quantity of diisopropyl formylphosphonate and dipentyl formylphosphonate and by following substantially the procedure described therein, there is obtained, respectively, diisopropyl (hydrazonomethyl)phosphonate and dipentyl (hydrazonomethyl)phosphonate which, when substituted for the diallyl (hydrazononmethyl)phosphonate of Step B, Example 4, and by following substantially the procedure therein, there is obtained respectively, diisopropyl (cis-1,2-epoxypropyl)phosphonate and dipentyl (cis-1,2-epoxypropyl)phosphonate.

EXAMPLE 5

Dibenzyl (Cis-1,2-epoxypropyl)phosphonate

To a solution of dibenzyl (diazomethyl)phosphonate (0.1 mole) in a solution of ether (25 ml.) and methanol (5 ml.) is added acetaldehyde (0.3 mole) at −10° C. The reaction mixture is maintained at −10° C. until nitrogen evolution ceases. The reaction mixture is allowed to come to room temperature and allowed to stand for 2 days. The solvents and excess acetaldehyde are removed under reduced pressure and the residue distilled under vacuum to yield dibenzyl (cis-1,2-epoxypropyl)phosphonate.

By substituting for the dibenzyl (diazomethyl)phosphonate of Example 5 an equimolar quantity of diphenyl (diazomethyl)phosphonate, dinaphthyl (diazomethyl)phosphonate and diphenethyl (diazomethyl)phosphonate and following substantially the procedure described above, there is obtained, respectively, diphenyl (cis-1,2-epoxypropyl)phosphonate, dinaphthyl (cis-1,2-epoxypropyl)phosphonate, and diphenethyl (cis-1,2-epoxypropyl)phosphonate.

EXAMPLE 6

P-(Cis-1,2-epoxypropyl)-N,N,N',N'-Tetramethylphosphonic Diamide

To a solution of acetaldehyde in a solution of diethyl ether (25 ml.) and methanol (5 ml.) is added an equimolar quantity of diazomethylphosphonic acid, tetramethyldiamide at −10° C. The reaction mixture is maintained at −10° C. for 3 hours until nitrogen evolution ceases. The reaction mixture is allowed to come to room temperature and allowed to stand for 3 days until decolorized. The excess solvent is removed under reduced pressure to yield P-(cis-1,2-epoxypropyl)-N,N,N',N'-tetramethylphosphonic diamide.

By substituting for the diazomethylphosphonic acid, tetramethyldiamide of Example 6 an equimolar quantity of diazomethylphosphonic acid, tetraethyldiamide and following substantially the procedure described therein, there is obtained P-(cis-1,2-epoxypropyl)-N,N,N',N'-tetraethylphosphonic diamide.

EXAMPLE 7

Dimethyl (Cis-1,2-epoxypropyl)phosphonate

To a solution of dimethyl formylphosphonate (1 gram) in diethyl ether (10 ml.) is added a solution of an equimolar quantity of diazoethane in diethyl ether (10 ml.) at 0° C. After standing 1 hour at 0° C., the solution is irradiated with ultraviolet light until the evolution of nitrogen ceases. The solvent is removed at reduced pressure and the residue vacuum distilled to yield dimethyl (cis-1,2-epoxypropyl)phosphonate.

By substituting for the dimethyl formylphosphonate an equimolar quantity of di-2,2,2-trichloroethyl formylphosphonate, diethyl formylphosphonate, di-n-propyl formylphosphonate, diisopropyl formylphosphonate and dipentyl formylphosphonate and by following substantially the procedure described therein, there is obtained, respectively, di-2,2,2-trichloroethyl (cis-1,2-epoxypropyl)phosphonate, diethyl (cis-1,2-epoxypropyl)phosphonate, dipropyl (cis-1,2-epoxypropyl)phosphonate and dipentyl (cis-1,2-epoxypropyl)phosphonate.

EXAMPLE 8

Dicyclohexyl (Cis-1,2-epoxypropyl)phosphonate

To a solution of dicyclohexyl formylphosphonate (1 gram) in diethyl ether (10 ml.) is added an equimolar solution of diazoethane in diethyl ether (10 ml.) at −20° C. After standing 1 hour at −20° C., the solution is irradiated with ultraviolet light until the evolution of nitrogen ceases. The solvent is removed at reduced pressure and the residue vacuum distilled to yield dicyclohexyl (cis-1,2-epoxypropyl)phosphonate.

By substituting for the dicyclohexyl formylphosphonate in Example 8 an equimolar quantity of dicyclopentyl formylphosphonate and by following substantially the procedure described therein, there is obtained dicyclopentyl (cis-1,2-epoxypropyl)phosphonate.

EXAMPLE 9

Dibenzyl (Cis-1,2-epoxypropyl)phosphonate

A solution of dibenzyl (diazomethyl)phosphonate (0.1 mole) in methanol (10 ml.) is added to a solution of acetaldehyde (0.1 mole) in methanol (10 ml.) at −10° C. The solution is stirred at −10° C. for 2 days until the nitrogen evolution ceases. The solvent is removed under reduced pressure and the residue distilled to yield dibenzyl (cis-1,2-epoxypropyl)phosphonate.

EXAMPLE 10

Dimethyl (Cis-1,2-epoxypropyl)phosphonate

To a solution of dimethyl formylphosphonate (1 gram) in methanol (20 ml.) is added an equimolar quantity of diazoethane in methanol (10 ml.) at −10° C. The reaction mixture is stirred at −10° C. until evolution of nitrogen ceases. The solvent is removed at reduced pressure and the residue vacuum distilled to yield dimethyl (cis-1,2-epoxypropyl)phosphonate.

By substituting for the dimethyl formylphosphonate of Example 10 an equimolar quantity of diethyl formylphosphonate, di-n-propyl formylphosphonate, di-isopropyl formylphosphonate, and dipentyl formylphosphonate and by following substantially the procedure described therein, there is obtained, respectively, diethyl (cis-1,2-epoxypropyl)phosphonate, di-n-propyl (cis-1,2-epoxypropyl)phosphonate, di-isopropyl (cis-1,2-epoxypropyl)phosphonate and dipentyl (cis-1,2-epoxypropyl)phosphonate.

EXAMPLE 11

(Cis-1,2-epoxypropyl)phosphonic Acid and Disodium Salt

Dimethyl (cis-1,2-epoxypropyl)phosphonate (1 m. mole) in trimethylchlorosilane (10 ml.) is refluxed for 8 hours; the reaction mixture is then extracted with water to yield an aqueous solution of (cis-1,2-epoxypropyl)phosphonic acid. The product thus obtained is then treated with two equivalents of sodium hydroxide to dryness to yield the disodium salt of (cis-1,2-epoxypropyl)phosphonic acid.

EXAMPLE 12

(Cis-1,2-epoxypropyl)phosphonic Acid, Monodiethylamine Salt

To a solution of dibenzyl (cis-1,2-epoxypropyl)phosphonate (0.01 mole) in diethylamine (0.01 mole) in ethanol (20 ml.) is added Raney nickel (1.0 g.). The mixture is shaken with hydrogen under 40 p.s.i. of pressure at room temperature until the calculated hydrogen uptake for the removal of two benzyl groups is reached. The reaction mixture is filtered free of the catalyst and the solvent removed under vacuum to yield (cis-1,2-epoxypropyl)phosphonic acid, monodiethylamine salt.

The above examples are illustrative of the novel process disclosed and it is to be understood that the invention is not to be limited by the specific illustrative examples but rather embraces all the variations and modifications thereof which fall within the scope of the foregoing discussion and the appended claims.

I claim:

1. A compound of the formula:

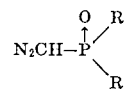

wherein R is lower alkoxy, monochloro-lower alkoxy, polychloro-lower alkoxy, lower cycloalkoxy, lower alkenyloxy, phenoxy, naphthyloxy, benzyloxy, phenethyloxy, or secondary amino radical of the formula: —N(R¹)₂ wherein R¹ is lower alkyl.

2. A compound according to claim 1 of the formula:

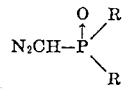

wherein R is lower alkoxy, polychloro-lower alkoxy, lower alkenyloxy, benzyloxy or phenethyloxy.

3. A compound according to claim 2 wherein R is methoxy, 2,2,2-trichloroethoxy, allyloxy or benzyloxy.

* * * * *